United States Patent [19]

Takahashi et al.

[11] Patent Number: 4,995,852
[45] Date of Patent: Feb. 26, 1991

[54] SINTERED OIL-RETAINING BUSHED CHAIN HAVING ROLLER

[75] Inventors: Toshio Takahashi, Osaka; Kazumasa Matsuno, Hyogo; Masaru Morimoto; Fumio Ochiai, both of Osaka, all of Japan

[73] Assignee: Tsubakimoto Chain Co., Japan

[21] Appl. No.: 245,326

[22] Filed: Sep. 14, 1988

[30] Foreign Application Priority Data

Apr. 6, 1988 [JP] Japan ............................ 63-45729[U]

[51] Int. Cl.[5] ............................................ F16G 13/08
[52] U.S. Cl. ........................................ 474/91; 474/231
[58] Field of Search .................... 474/91, 206, 231; 29/149.5 PM

[56] References Cited

U.S. PATENT DOCUMENTS

| | | | |
|---|---|---|---|
| 2,372,203 | 3/1945 | Hensel et al. | 29/149.5 PM X |
| 3,643,517 | 2/1972 | Paul | 474/91 |
| 4,615,171 | 10/1986 | Burk | 474/206 X |

Primary Examiner—Ramon S. Britts
Assistant Examiner—Matthew Smith
Attorney, Agent, or Firm—Eckert Seamans Cherin & Mellott

[57] ABSTRACT

An improved chain comprising inner link plates, sintered oil-retaining bushings secured to the inner link plates, outer link plates, connecting pins secured to the outer link plates and the pins being rotatable within the bushings, the improvement comprising: the sintering density of the bushings being in the range of approximately 6.0 g/cm$^3$ to 7.1 g/cm$^3$; and, a roller rotatably supported on each bushing.

3 Claims, 1 Drawing Sheet

SINTERED OIL-RETAINING BUSHED CHAIN HAVING ROLLER

FIELD OF THE INVENTION

This invention relates to the field of chains, and in particular, to small-sized chains used for motorcycles, general transmissions, conveyors and the like.

BACKGROUND OF THE INVENTION

Chains with conventionally sintered oil-retaining bushings are widely used because periodic lubrication is not required. However, if the oil-retaining ratio is increased to enhance the lubrication property by lowering the sintered of the bushing, the mechanical strength of the bushing is lowered. On the other hand, if the mechanical strength is improved by increasing the sintered density, the oil-retaining ratio is lowered, and the bushing exhibits a rather poor lubrication property. Thus, it has been the conventional wisdom in the art to increase the oil-retaining capacity by lowering the sintered density; and at the same time, to retain the mechanical strength by making the diameter of the bushing larger.

In case of the above-mentioned prior art, as shown in FIG. 2, when the teeth of a sprocket engage the sintered oil-retaining bushing B, the bushing B is unable to freely rotate, since its both ends are force-fit into the bores of the inner link plates L1. Consequently, only a limited portion of each bushing B is subjected to wear due to the engagement with the sprocket. In other words, the wear and stress is highly localized and especially damaging. Likewise, the teeth of the sprocket are subjected to localized wear due to slippage, which tends to give rise to improper engagement between the sprocket and chain.

Furthermore, if a roller is used in conjunction with the bushing in order to prevent such localized wear, the outer diameter of the roller is very large. because the outer diameter of the bushing itself is large to retain mechanical strength, as mentioned above. This in turn requires the engagement pitch with the sprocket being unduly large, which requires the lengths of link plates to become larger. The result has been a practical inability to produce strong, self-lubricating small-sized chains.

Accordingly, it has become accepted practice in the art to make small-sized chains, with bushings by means of direct contact between the bushings and sprockets, that is, without rollers. Therefore, localized wear and premature failure of such chains has been unavoidable.

SUMMARY OF THE INVENTION

It is an object of this invention to provide a small-sized sintered oil-retaining bushed chain having rollers, which does not cause the engagement pitch with the sprocket to be unduly large, which retains the lubrication property, and which avoids localized wear and premature failure.

These and other objects of the invention are provided by an improved bushed chain, comprising inner link plates to which a sintered oil-retaining bushing is secured and outer link plates to which a connecting pin is secured, said pin being rotatable within, said bushing, the improvement comprising: the sintered of said bushings being in the range of about 6.0 g/cm$^3$ to 7.1 g/cm$^3$; and, a roller rotatably supported on each bushing.

The bushed chain according to the present invention, in which the sintered density is in the range of approximately 6.0 g/cm$^3$ to 7.1 g/cm$^3$, retains the advantage of a 6.0 g/cm conventionally sintered, bushed chain in that periodic lubrication is not necessary. Moreover, the outer diameter of the roller rotatably supported upon the bushing is almost the same as the outer diameter of the conventional bushed chain without a roller, the mechanical strength being kept within the necessary range. Thus, it is not necessary to lengthen the link plates; and, the rollers supported on the bushings may rotate freely when the chain engages a sprocket, preventing localized wear. The bushing enables smooth rotation between the roller, the bushing and the connecting pin by means of automatic self-lubrication.

The anti-wear property of the pin may be improved by providing plating or hardening treatment to the peripheral surface of the connecting pin, thus preventing stretching of the chain.

Moreover, by setting the thickness of the bushing at approximately 110% to 140% of that of the roller, the sintering density may be uniform and the formation of cracks during manufacturing may be prevented.

DETAILED DESCRIPTION OF THE PREFERRED EMBODIMENTS

Figure 1:
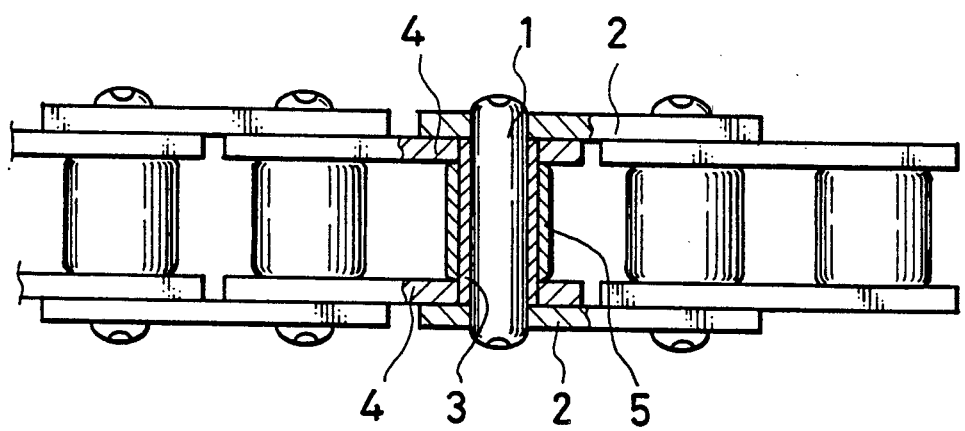
FIG. 1 is a partially sectioned front view of a bushed transmission chain according to the present invention; and, FIG. 2 is a partially sectioned front view of a bushed transmission chain according to the prior art.
Figure 2:
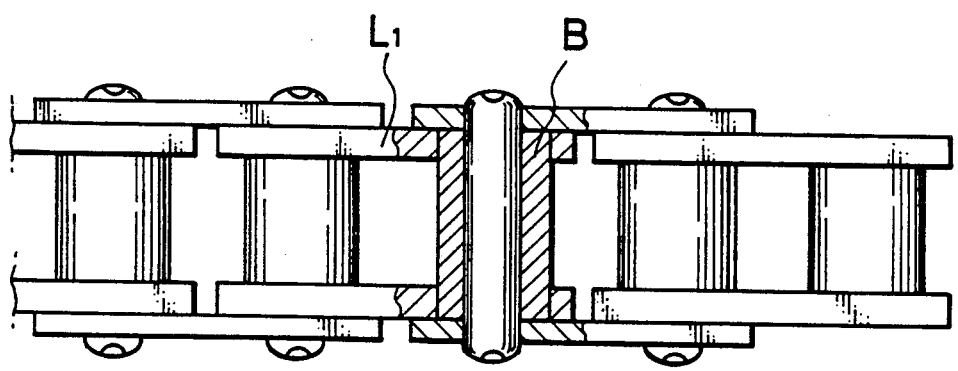

The transmission chain of FIG. 1 comprises outer link plates 2,2 to which pins 1 are force-fit; and, inner link plates 4,4 to which sintered oil-retaining bushings 3 are force-fit. Each bushing 3 may rotate freely about a pin 1. A roller 5 is rotatably supported by each bushing 3.

The sintered density of the oil-retaining bushing 3 is in the range of approximately 6.0 g/cm$^3$ to 7.1 g/cm$^3$, and is currently preferred to be approximately 6.8 g/cm$^3$. However, the thickness of the bushing is made larger than the thickness of the roller by a factor in the range of approximately 110% to 140%, and preferably approximately 131%. Such an increase assures that cracks may be prevented during the manufacturing, and that the sintered density may be uniform. A decrease in the strength of the bushing due to a greater sintered density may also be prevented with a uniform sintered density, which also prevents occurrence of cracks during manufacturing.

The decrease in the oil-retaining ratio of the bushing is limited and does not effectively reduce the lubrication property. Moreover, the mechanical strength is maintained. Thus, the engagement with a sprocket may be smooth and long wearing.

Inasmuch as the sintered density of the bushing is greater than that of a conventional bushing, the surface of the pins 1 is provided with a surface hardening treatment, such as, boronizing or chromizing; or, plating with nickel and the like. This significantly reduces wear of the connecting pins.

Since the sintered density of the oil-retaining bushing is made in the range of approximately 6.0 g/cm$^3$ to 7.1 g/cm$^3$, the oil-retaining ratio may be maintained within a practically requisite range, while also limiting the decrease of the mechanical strength within a practically requisite range. Thus, the diameter of the bushing may be made smaller and the bushing may be provided with a roller, the diameter of the roller being approximately equal to that of the above-mentioned, conventional larger-diameter bushing. The result is practical, long wearing smoothly operating small-sized chains. Moreover, since the roller may rotate during the engagement with a sprocket, the engagement may be smoother, thus preventing localized wear of a roller and the teeth of a sprocket. This would serve to decrease engagement noise. All of these advantages are achieved without sacrificing a significant basic advantage of sintered bushing chains, namely, that it is not necessary to periodically lubricate the chain.

The invention may be embodied in other specific forms without departing from the spirit or essential attributes thereof. Accordingly, reference should be made to the appended claims, rather than to the foregoing specification, as indicating the scope of the invention.

What is claimed is:

1. An improved chain comprising inner link plates, sintered oil-retaining bushings secured to the inner link plates, outer link plates, connecting pins secured to the outer link plates and the pins being rotatable within the bushings, the improvement comprising:

the sintered density of the bushings being in the range of approximately 6.0 g/cm$^3$ to 7.1 g/cm$^3$; and, a roller rotatably supported on each bushing, wherein the wall thickness of the bushings is greater than the wall thickness of the rollers by a factor in the range of 110% to 140%.

2. An improved chain comprising inner link plates, sintered oil-retaining bushings secured to the inner link plates, outer link plates, connecting pins secured to the outer link plates and the pins being rotatable within the bushings, the improvement comprising:

the sintered density of the bushings being in the range of approximately 6.0 g/cm$^3$ to 7.1 g/cm$^3$; and, a roller rotatably supported on each bushing, wherein the surface of the connecting pin is subjected to a hardening treatment, and the wall thickness of the bushings is greater than the wall thickness of the rollers by a factor in the range of approximately 110% to 140%.

3. An improved chain comprising inner link plates, sintered oil-retaining bushings secured to the inner link plates, outer link plates, connecting pins secured to the outer link plates and the pins being rotatable within the bushings, the improvement comprising:

the sintered density of the bushings being in the range of approximately 6.0 g/cm$^3$ to 7.1 g/cm$^3$; and, a roller rotatably supported on each bushing, wherein the surface of the connecting pin is plated, and the wall thickness of the bushings is greater than the wall thickness of the rollers by a factor in the range of approximately 110% to 140%.

* * * * *